Patented Aug. 8, 1933

1,921,381

UNITED STATES PATENT OFFICE 1,921,381

PRODUCTION OF ALCOHOLS OF HIGH MOLECULAR WEIGHT

Hans Beller, Ludwigshafen-on-the-Rhine, and Martin Luther, of Mannheim, Germany, assignors to I. G. Farbenindustrie Aktiengesellschaft, Frankfort-on-the-Main, Germany No Drawing. Application July 11, 1931, Serial No. 550,276, and in Germany July 17, 1930

8 Claims. (Cl. 260—156)

The present invention relates to the production of alcohols of high molecular weight.

By the liquid phase oxidation of difficultly volatile, i. e. from liquid to solid, non-aromatic hydrocarbons containing at least 8 carbon atoms or mixtures thereof, such as hard or soft paraffin wax, paraffin oil or high boiling fractions, or residues, of mineral oils or of oils from the destructive hydrogenation or cracking of coals, tars or mineral oils, a mixture of from liquid to solid products containing oxygen is usually obtained which besides acid constituents, such as carboxylic acids, hydroxy carboxylic acids, also contains derivatives of the acids and neutral constituents containing oxygen, such as esters, alcohols, aldehydes and ketones, and also unattacked hydrocarbons. The separation of the single components of this mixture is necessary for their further employment, but offers difficulties.

We have now found that the alcohols of high molecular weight can be obtained from the said from liquid to solid oxidation products in a practically pure form by subjecting the oxidation products, if desired, after separating the acid constitutents contained therein in a free or combined form and, if desired, after separating the greater part of the unattacked initial hydrocarbons to a treatment with hydrogen, preferably in the presence of one or more of the usual hydrogenation catalysts and subsequently to extraction with water-soluble aliphatic alcohols, such as methanol, ethanol, propanol, or butanol, or with their esters with fatty acids containing up to 3 carbon atoms, as for example methyl or ethyl formates or acetates, in the presence of some water. By the said extraction, the alcohols of high molecular weight are dissolved while unchanged hydrocarbons remain practically undissolved. The quantity of water is generally between about 1 and 20 per cent by weight of the alcohols or esters employed as solvents for the extraction. The said solvents have a selective solvent power for the hydroxyl-bearing components of the oxidation product by reason of their water content. By regulating the quantity of water, alcohols of different molecular weight can be recovered, the alcohols of highest molecular weight being obtained on working with the solvent containing quantities of water near the lower limit of the aforesaid range.

The aforesaid separation of the acid constituents may be carried out in any usual and convenient manner for example by acting with an alkali or alkaline earth on the oxidation products whereby a saponification is performed and subjecting the resulting product to extraction with benzine or a similar mineral oil fraction. The hydrogenation is carried out in the liquid phase at pressures between about 30 and 200 atmospheres, preferably between 30 and 150 atmospheres, and at temperatures between about 150° and about 300° C.; it is advantageously performed with the employment of the usual hydrogenation catalysts such as copper, nickel, cobalt or their salts, copper chromites, if desired in conjunction with the well known promoters capable of further accelerating hydrogenation.

The whole unsaponifiable fraction of the oxidation product remaining after the removal of the acid constituent and containing unattacked hydrocarbons may be subjected as such to the extraction after the hydrogenation treatment. It is especially advantageous, however, for example when a great part of the initial hydrocarbons is not oxidized, first to carry out a partial separation of the unsaponifiable fraction, as for example by centrifuging, sweating, pressing or extracting, whereby the content of compounds containing oxygen is increased in the centrifuged fraction. If desired, the oxidation product may be catalytically hydrogenated before removal of the saponifiable fraction.

The alcohols of high molecular weight remaining after distilling off the solvent employed are of varying consistency, depending on the nature of the initial materials, and may be liquid, unctuous or solid, a mixture of about 20 per cent of liquid alcohols having a number of carbon atoms of from 9 to 14 with about 80 per cent of solid alcohols having a number of carbon atoms of from 15 to 24 being obtainable for example from the products of a liquid phase oxidation of hard paraffin wax and liquid alcohols being obtainable from the products of a liquid phase oxidation of liquid initial materials. The alcohols have a pleasant characteristic odour and a pale yellow or white colour; their hydroxyl value is on an average from 200 to 300. The alcohols have hydroscopic properties. They may be worked up into pastes, ointments, creams, polishing preparations and the like. Sulphuric esters and sulphonic acids prepared from these alcohols by known methods as well as the salts of these acids are excellent washing and emulsifying agents.

The following examples will further illustrate the nature of this invention but the invention is not restricted to these examples. The parts are by weight.

Example 1

The acid constituents present in a free or combined form in an oxidation product of hard paraffin wax obtained by blowing with air at 160° centigrade for five hours are removed by treatment with a quantity of an aqueous 25 per cent caustic soda solution exceeding that required for neutralization. The unsaponifiable constituents contained in the remaining oxidation product are separated from the greater part of the unattacked hard paraffin wax by centrifuging in a seive centrifuge and are hydrogenated with hydrogen while employing a nickel catalyst at 250° C. under a pressure of 50 atmospheres, the carbonyl compounds present being thus wholly or partially converted into alcohols according to the duration of the hydrogenation.

100 parts of this product are stirred while heating with 300 parts of methanol containing 4 per cent of water. When the mixture is allowed to stand, it separates into two layers the upper of which contains about 60 per cent of the alcohols of high molecular weight containing from 9 to 24 carbon atoms dissolved in methanol. After withdrawing this layer, the methanol is distilled off and recovered. By repeating the extraction the alcohols are isolated almost completely. The residue remaining after evaporating off the methanol consists of a mixture of alcohols of high molecular weight the hydroxyl value of which is from about 190 to 200.

Example 2

100 parts of a neutral product containing oxygen from an oxidation product of soft paraffin wax, prepared as described in Example 1 and by separating the acid constituents by saponification with an aqueous concentrated sodium carbonate solution at 160° C. in a closed vessel, extracting unsaponifiable matter from the emulsion by means of gasoline at about 70° C. and hydrogenating the residue, after evaporating the benzine, by heating with hydrogen at a pressure of about 50 atmospheres to 190° C. in the presence of 0.5 per cent by weight of the residue of metallic cobalt are stirred while heating with 500 parts of methyl formate containing 10 per cent of water. The resulting mixture separates into two layers. After evaporating the methyl formate from the lower layer separated from the upper layer a mixture of semisolid alcohols having the hydroxyl value of 236 is obtained.

Example 3

100 parts of soft paraffin wax are blown for 2 hours with 1 cubic meter of air per hour and each kilogram of wax at 160° C. after adding 4 parts of boric anhydride. After splitting the boric esters in the resulting product by boiling with water for 1 hour, the oxidation product which consists of a mixture of alcohols, carbonyl compounds and carboxylic acids with 40 parts of initial wax, is heated with hydrogen at a pressure of 100 atmospheres and at 200° C. in an autoclave in the presence of 4 parts of a nickel catalyst consisting of kieselguhr on which 25 per cent its weight of nickel and 0.1 per cent of copper have been deposited for from 6 to 8 hours whereby the carbonyl compounds and acids are converted into alcohols.

The resulting mixture is stirred at 45° C. with 4 times its weight of aqueous 96 per cent ethyl alcohol. After cooling the solution is filtered off from the non-dissolved matter and the alcohol is distilled off. A mixture of alcohols of high molecular weight which possesses a hydroxyl value of 210 is obtained. By repeating the extraction the alcohols present can be separated from hydrocarbons practically completely.

What we claim is:

1. The process for the production of alcohols of high molecular weight which comprises acting on a from liquid to solid product of the liquid phase oxidation of difficulty volatile non-aromatic hydrocarbons with hydrogen at a temperature between 150° and 300° C., at a pressure between 30 and 150 atmospheres and in the presence of a hydrogenation catalyst and subjecting the resulting product to an extraction with an aqueous solvent selected from the group consisting of water-soluble aliphatic alcohols and their esters with fatty acids containing up to 3 carbon atoms.

2. The process for the production of alcohols of high molecular weight which comprises separating off the acid constituents from a from liquid to solid product of the liquid phase oxidation of difficulty volatile non-aromatic hydrocarbons, acting on the resulting product with hydrogen at a temperature between 150° C. and 300° C., at a pressure between 30 and 150 atmospheres and in the presence of a hydrogenation catalyst and subjecting the resulting product to an extraction with an aqueous solvent selected from the group consisting of water-soluble aliphatic alcohols and their esters with fatty acids containing up to 3 carbon atoms.

3. The process for the production of alcohols of high molecular weight which comprises acting on a from liquid to solid product of the liquid phase oxidation of difficultly volatile non-aromatic hydrocarbons with hydrogen at a temperature between 150° and 300° C., at a pressure between 30 and 150 atmospheres and in the presence of a hydrogenation catalyst separating off carboxylic acids and their derivatives present, and subjecting the resulting product to an extraction with an aqueous solvent selected from the group consisting of water-soluble aliphatic alcohols and their esters with fatty acids containing up to 3 carbon atoms.

4. The process for the production of alcohols of high molecular weight which comprises acting on a from liquid to solid product of the liquid phase oxidation of difficultly volatile non-aromatic hydrocarbons with hydrogen at a temperature between 150° and 300° C., at a pressure between 30 and 150 atmospheres and in the presence of a hydrogenation catalyst and subjecting the resulting product to an extraction with an aqueous solvent selected from the group consisting of water-soluble aliphatic alcohols and their esters with fatty acids containing up to 3 carbon atoms, containing from 1 to 20 per cent by weight of water.

5. The process for the production of alcohols of high molecular weight which comprises acting on a from liquid to solid product of the liquid phase oxidation of difficultly volatile non-aromatic hydrocarbons with hydrogen at a temperature between 150° and 300° C., at a pressure between 30 and 150 atmospheres and in the presence of a hydrogenation catalyst and subjecting the resulting product to an extraction with an aqueous ester of a water-soluble aliphatic alcohol with a fatty acid containing up to 2 carbon atoms.

6. The process for the production of alcohols of high molecular weight which comprises separating off the acid constituents from a from liquid to solid product of the liquid phase oxidation of difficulty volatile non-aromatic hydrocarbons, removing unattacked hydrocarbon material, acting on the resulting product with hydrogen at a temperature between 150° and 300° C., at a pressure between 30 and 150 atmospheres and in the presence of a hydrogenation catalyst and subjecting the resulting product to an extraction with an aqueous solvent selected from the group consisting of water-soluble aliphatic alcohols and their esters with fatty acids containing up to 3 carbon atoms.

7. The process for the production of alcohols of high molecular weight which comprises acting on a from liquid to solid product of the liquid phase oxidation of a paraffin wax with hydrogen at a temperature between 150° and 300° C., at a pressure between 30 and 150 atmospheres and in the presence of a hydrogenation catalyst and subjecting the resulting product to an extraction with a water-soluble aliphatic alcohol containing some water.

8. The process for the production of alcohols of high molecular weight which comprises separating off the acid constituents from a from liquid to solid product of the liquid phase oxidation of paraffin wax, subjecting the resulting product to extraction with a gasoline while warming, acting on the extract with hydrogen at about 50 atmospheres and at from 130° to 200° C., in the presence of a hydrogenation catalyst comprising nickel and subjecting the resulting product to extraction with an about 96 per cent aqueous ethyl alcohol.

HANS BELLER.
MARTIN LUTHER.

CERTIFICATE OF CORRECTION.

Patent No. 1,921,381.　　　　　　　　　　　　August 8, 1933.

HANS BELLER, ET AL.

It is hereby certified that error appears in the printed specification of the above numbered patent requiring correction as follows: Page 2, lines 85 and 99, and page 3, line 4, claims 1, 2 and 6 respectively, for "difficulty" read difficultly; and page 3, line 88, claim 8, for "130°" read 180°; and that the said Letters Patent should be read with this correction therein that the same may conform to the record of the case in the Patent Office.

Signed and sealed this 16th day of October, A. D. 1934.

(Seal)　　　　　　　　　　　　　　　　Leslie Frazer
　　　　　　　　　　　　　　　　Acting Commissioner of Patents.

of high molecular weight which comprises separating off the acid constituents from a from liquid to solid product of the liquid phase oxidation of difficulty volatile non-aromatic hydrocarbons, removing unattacked hydrocarbon material, acting on the resulting product with hydrogen at a temperature between 150° and 300° C., at a pressure between 30 and 150 atmospheres and in the presence of a hydrogenation catalyst and subjecting the resulting product to an extraction with an aqueous solvent selected from the group consisting of water-soluble aliphatic alcohols and their esters with fatty acids containing up to 3 carbon atoms.

7. The process for the production of alcohols of high molecular weight which comprises acting on a from liquid to solid product of the liquid phase oxidation of a paraffin wax with hydrogen at a temperature between 150° and 300° C., at a pressure between 30 and 150 atmospheres and in the presence of a hydrogenation catalyst and subjecting the resulting product to an extraction with a water-soluble aliphatic alcohol containing some water.

8. The process for the production of alcohols of high molecular weight which comprises separating off the acid constituents from a from liquid to solid product of the liquid phase oxidation of paraffin wax, subjecting the resulting product to extraction with a gasoline while warming, acting on the extract with hydrogen at about 50 atmospheres and at from 130° to 200° C., in the presence of a hydrogenation catalyst comprising nickel and subjecting the resulting product to extraction with an about 96 per cent aqueous ethyl alcohol.

HANS BELLER.
MARTIN LUTHER.

CERTIFICATE OF CORRECTION.

Patent No. 1,921,381.            August 8, 1933.

HANS BELLER, ET AL.

It is hereby certified that error appears in the printed specification of the above numbered patent requiring correction as follows: Page 2, lines 85 and 99, and page 3, line 4, claims 1,2 and 6 respectively, for "difficulty" read difficultly; and page 3, line 88, claim 8, for "130°" read 180°; and that the said Letters Patent should be read with this correction therein that the same may conform to the record of the case in the Patent Office.

Signed and sealed this 16th day of October, A. D. 1934.

(Seal)                                        Leslie Frazer
                                           Acting Commissioner of Patents.

CERTIFICATE OF CORRECTION.

Patent No. 1,921,381.  August 8, 1933.

HANS BELLER, ET AL.

It is hereby certified that error appears in the printed specification of the above numbered patent requiring correction as follows: Page 2, lines 85 and 99, and page 3, line 4, claims 1, 2 and 6 respectively, for "difficulty" read difficultly; and page 3, line 88, claim 8, for "130°" read 180°; and that the said Letters Patent should be read with this correction therein that the same may conform to the record of the case in the Patent Office.

Signed and sealed this 16th day of October, A. D. 1934.

(Seal)

Leslie Frazer
Acting Commissioner of Patents.